UNITED STATES PATENT OFFICE.

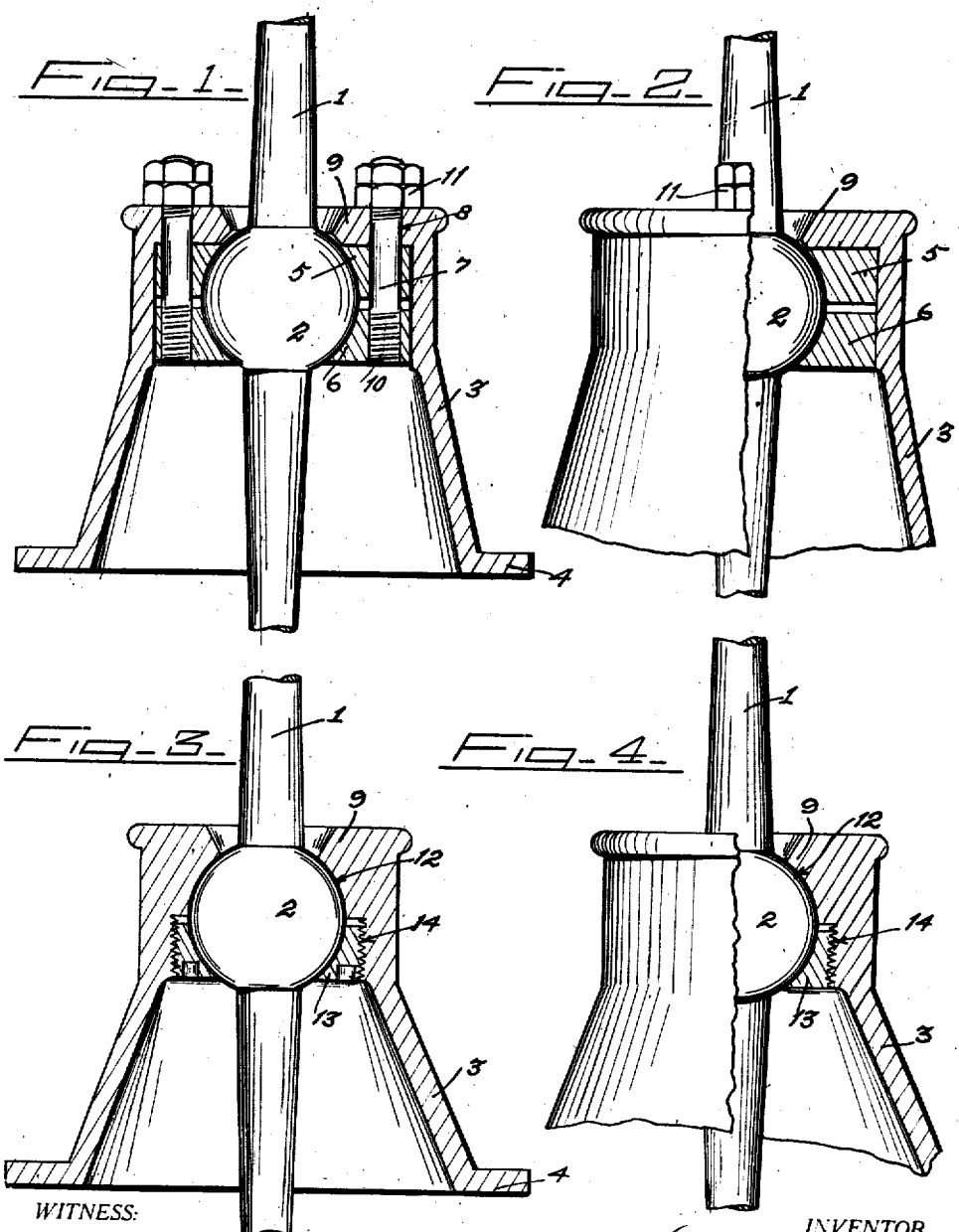

GEORGE C. JENSEN, OF OAKLAND, CALIFORNIA.

LEVER-MOUNTING.

1,267,079.  Specification of Letters Patent.  Patented May 21, 1918.

Original application filed March 31, 1917. Divided and this application filed September 10, 1917. Serial No. 190,427.

*To all whom it may concern:*

Be it known that I, GEORGE C. JENSEN, a citizen of the United States, residing at Oakland, in the county of Alameda and State of California, have invented certain new and useful Improvements in Lever-Mountings, of which the following is a specification.

This invention is a division of application eventuating in Letters Patent No. 1235035, granted to me July 31, 1917, and relates to levers, particularly that type universally employed in the shifting of the variable speed mechanism of motor driven vehicles.

Levers of the ball and socket type as at present constructed employ a removable collar which is insertible from the exterior and adjustably engages the housing and retains the spherical fulcrum portion seated within its coöperating socket. It has been found desirable to lock the shift levers above described from operative movement to prevent the operation of the vehicle carrying the same by unauthorized persons, but with the levers as now universally mounted, the locking of the same is defeated by the removal of the retaining collar which permits of the easy removal of the lever from its socket and the insertion of a stick or other operating member in place thereof to shift the gears.

The invention has for its principal objects to provide an improved mounting for the ball and socket type levers whereby the movable or adjustable member for retaining the lever in its socket is positioned within the housing and is concealed from view, thereby preventing the removal of the lever from its socket when the lever is in locked position.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a vertical cross sectional view of an embodiment of my invention.

Fig. 2 is a broken sectional view of the construction illustrated in Fig. 1.

Fig. 3 is a vertical cross sectional view of an embodiment of my invention with the retaining member or collar threaded within the underside of the socket.

Fig. 4 is a broken sectional view of an embodiment of the invention illustrated in Fig. 3.

Referring more particularly to the several views of the drawings, wherein like characters of reference designate corresponding parts,—1 indicates a suitable lever of the type commonly employed in the shifting of the variable speed power transmitting mechanism of a motor vehicle. The lever is formed intermediate of its length with a substantially spherical portion 2, and is adapted to extend upwardly through a tubular housing 3 in the upper surface of the cover 4 for the shiftable power transmitting mechanism not shown. In Figs. 1 and 2 of the drawings the portion 2 is received within a cylindrical bearing or socket member formed of the upper and lower half sections 5 and 6 provided with alined openings through which pass the adjusting bolts 7 which also extend through openings 8 in the upper wall 9 of the tubular housing. The bolts 7 pass loosely through the alined openings in the upper half section 5 and are threaded or otherwise secured, as at 10, within the openings in the lower half section 6, thus the adjustment of the nuts 11 on the upper ends of the bolts 7 will take up any wear between the half sections 5 and 6 and the spherical portion 2.

In Figs. 3 and 4 a semi-spherical seat 12 is formed in the underside of the housing top wall 9 and in the same is seated the upper surface of the spherical portion 2 of the shifting lever, and in this form the adjusting member is in the form of a collar 13 threaded into the underside of the tubular housing 3 as at 14.

By my improved construction the removal of the lever from its socket is precluded while the socket is in position on the gear casing, and the wear between the fulcrum portion of the lever and the socket portion of the case is capable of being compensated, in the first form by the adjustment of the nuts 11, and in the latter construction by the threading of the collar 13 relatively to its support.

Having thus described my invention, what I claim as new and desire to protect by Letters Patent is:—

1. In combination with a lever, a tubular support providing a fulcrum for said lever and within which the same is removably positioned by insertion upwardly from the lower end thereof, and means integral with said support for overlying the fulcrum point of said lever for preventing the removal of the lever through the upper open end of said support.

2. In combination with a lever provided with a spherical fulcrum portion, a tubular support within which the lever is removably positioned by insertion upwardly from the lower end thereof, means integral with said support and overlying said spherical portion for preventing the removal of the lever therefrom through the upper open end thereof, and means insertible through the lower end of said support for retaining the lever therein with said support a fulcrum therefor.

3. In combination with a lever provided intermediate of its length with a spherical fulcrum portion, a tubular support within which said lever is removably mounted, the interior area of said support being reduced adjacent one end and beneath which reduced portion said fulcrum portion lies, and a fulcrum member insertible into said support from the lower end thereof and engaging said spherical portion to provide a fulcrum therefor, said reduced area of said support precluding the removal of said lever from the support through the upper open end thereof.

4. In combination with a lever provided with an enlarged fulcrum portion, a tubular support within which said lever is removably mounted, said support provided adjacent its upper end with a contracted portion beneath which said fulcrum portion lies, and means insertible into said support from the lower end thereof and lying beneath said contracted portion for receiving said enlarged portion and providing a fulcrum for the lever, said contracted portion precluding the removal of said lever from said support through the upper open end thereof.

5. In combination with a lever, a tubular support within which said lever is fulcrumed by insertion therein upwardly from the lower end thereof, said support provided with means for preventing the removal of the lever through the upper open end thereof.

In testimony whereof I have signed my name to this specification in the presence of a subscribing witness.

GEORGE C. JENSEN.

Witness:
D. B. RICHARDS.